United States Patent

Cech

(10) Patent No.: US 9,302,630 B2
(45) Date of Patent: Apr. 5, 2016

(54) SYSTEM AND METHOD FOR RECEIVING AUDIBLE INPUT IN A VEHICLE

(75) Inventor: Leonard Cech, Brighton, MI (US)

(73) Assignee: TK Holdings Inc., Auburn Hills, MI (US)

( * ) Notice: Subject to any disclaimer, the term of this patent is extended or adjusted under 35 U.S.C. 154(b) by 652 days.

(21) Appl. No.: 12/292,149

(22) Filed: Nov. 12, 2008

(65) Prior Publication Data

US 2009/0192795 A1  Jul. 30, 2009

Related U.S. Application Data

(63) Continuation-in-part of application No. 12/213,591, filed on Jun. 20, 2008.

(60) Provisional application No. 60/996,351, filed on Nov. 13, 2007, provisional application No. 61/006,298, filed on Jan. 4, 2008.

(51) Int. Cl.
*G10L 15/20* (2006.01)
*B60R 11/02* (2006.01)
*B60R 16/037* (2006.01)
*G10L 21/0208* (2013.01)
*B60R 11/00* (2006.01)

(52) U.S. Cl.
CPC ............ *B60R 11/02* (2013.01); *B60R 16/0373* (2013.01); *G10L 21/0208* (2013.01); *B60R 11/0247* (2013.01); *B60R 2011/001* (2013.01); *G10L 15/20* (2013.01)

(58) Field of Classification Search
CPC ................. G10L 2021/02166; G10L 21/0208
USPC ......................................... 704/275, 256, 233
See application file for complete search history.

(56) References Cited

U.S. PATENT DOCUMENTS

| 4,850,015 A |   | 7/1989  | Martin |
|---|---|---|---|
| 5,566,072 A | * | 10/1996 | Momose et al. .............. 701/117 |
| 5,666,102 A |   | 9/1997  | Lahiff |

(Continued)

FOREIGN PATENT DOCUMENTS

| CN | 1771158 A   | 5/2006 |
|---|---|---|
| CN | 101107145 A | 1/2008 |

(Continued)

OTHER PUBLICATIONS

International Search Report and Written Opinion mailed May 13, 2010, received in International application No. PCT/US2009/063822.

(Continued)

*Primary Examiner* — Jakieda Jackson
(74) *Attorney, Agent, or Firm* — Gordon & Rees LLP

(57) ABSTRACT

A steering wheel system for a vehicle includes a first microphone mounted in a steering wheel and a second microphone mounted in the vehicle. The first and second microphones are each configured to receive an audible input. The audible input includes an oral command component and a noise component. The steering wheel system also includes a controller configured to identify the noise component by determining that the noise component received at the first microphone is out of phase with the noise component received at the second microphone. The controller is configured to cancel the noise component from the audible input.

17 Claims, 6 Drawing Sheets

(56) References Cited

U.S. PATENT DOCUMENTS

| | | | | |
|---|---|---|---|---|
| 5,758,311 | A * | 5/1998 | Tsuji et al. | 701/111 |
| 5,821,935 | A | 10/1998 | Hartman et al. | |
| 5,850,458 | A * | 12/1998 | Tomisawa et al. | 381/71.4 |
| 6,219,645 | B1 * | 4/2001 | Byers | 704/275 |
| 6,339,758 | B1 * | 1/2002 | Kanazawa et al. | 704/226 |
| 6,782,240 | B1 * | 8/2004 | Tabe | 455/66.1 |
| 7,414,520 | B2 | 8/2008 | Meißner | |
| 7,605,694 | B2 | 10/2009 | Prost-Fin et al. | |
| 7,775,884 | B1 | 8/2010 | McCauley | |
| 7,786,886 | B2 | 8/2010 | Maruyama et al. | |
| 2001/0011200 | A1 * | 8/2001 | Kobayashi et al. | 701/36 |
| 2002/0068605 | A1 | 6/2002 | Stanley | |
| 2002/0135163 | A1 | 9/2002 | Derrick | |
| 2003/0064748 | A1 | 4/2003 | Stulberger | |
| 2003/0182810 | A1 * | 10/2003 | Sano | 33/1 PT |
| 2004/0122562 | A1 | 6/2004 | Geisler et al. | |
| 2004/0138882 | A1 * | 7/2004 | Miyazawa | 704/233 |
| 2004/0240679 | A1 * | 12/2004 | Kennedy et al. | 381/82 |
| 2005/0152563 | A1 | 7/2005 | Amada et al. | |
| 2005/0189159 | A1 | 9/2005 | Weber et al. | |
| 2006/0070795 | A1 | 4/2006 | Meissner | |
| 2006/0115103 | A1 * | 6/2006 | Feng et al. | 381/313 |
| 2006/0188107 | A1 * | 8/2006 | Inoue et al. | 381/71.4 |
| 2006/0204026 | A1 * | 9/2006 | Kargus, IV | 381/359 |
| 2006/0285697 | A1 * | 12/2006 | Nishikawa et al. | 381/71.1 |
| 2006/0286944 | A1 | 12/2006 | Songwe | |
| 2007/0039775 | A1 * | 2/2007 | Matsuno et al. | 180/446 |
| 2007/0089661 | A1 * | 4/2007 | Yazaki et al. | 114/144 RE |
| 2007/0127736 | A1 * | 6/2007 | Christoph | 381/92 |
| 2007/0182529 | A1 * | 8/2007 | Dobler | B60K 28/06 340/438 |
| 2007/0238491 | A1 | 10/2007 | He | |
| 2007/0257889 | A1 | 11/2007 | Croy | |
| 2007/0280506 | A1 * | 12/2007 | Hahn | G06T 5/50 382/104 |
| 2008/0023253 | A1 | 1/2008 | Prost-Fin et al. | |
| 2008/0059026 | A1 * | 3/2008 | Akiyama | 701/41 |
| 2008/0061954 | A1 | 3/2008 | Kulas | |
| 2008/0143505 | A1 | 6/2008 | Maruyama et al. | |
| 2009/0093924 | A1 * | 4/2009 | Aso | B62D 1/28 701/31.4 |
| 2010/0235048 | A1 * | 9/2010 | Richerzhagen | B62D 15/023 701/41 |
| 2010/0295670 | A1 | 11/2010 | Sato et al. | |

FOREIGN PATENT DOCUMENTS

| | | |
|---|---|---|
| DE | 100 13 432 C1 | 9/2001 |
| DE | 10 2004 042 331 A1 | 12/2005 |
| JP | 2001-253219 | 9/2001 |
| JP | 2002-154397 | 5/2002 |
| JP | 2003-066986 | 3/2003 |
| JP | 2003-195890 | 7/2003 |
| JP | 2003-276526 | 10/2003 |
| JP | 2003-300468 | 10/2003 |
| JP | 2004-053492 | 2/2004 |
| JP | 2004-132897 A | 4/2004 |
| JP | 2004-149120 | 5/2004 |
| JP | 2004-153660 | 5/2004 |
| JP | 2004-206063 | 7/2004 |
| JP | 2004-287728 | 10/2004 |
| JP | 2004-338442 A | 12/2004 |
| JP | 2005-195955 | 7/2005 |
| JP | 2005231622 | 9/2005 |
| JP | 2006-047198 | 2/2006 |
| JP | 2006151192 | 6/2006 |
| JP | 2006-521954 | 9/2006 |
| JP | 2006264615 | 10/2006 |
| JP | 2010-539586 | 12/2010 |
| KP | 2000 0017980 A | 4/2000 |
| KR | 2000-0017980 | 4/2000 |
| KR | 2002-088912 A | 11/2002 |
| KR | 2005-0089253 | 9/2005 |
| KR | 2006-0026157 | 3/2006 |
| WO | WO 2006/076903 A1 | 7/2006 |
| WO | WO 2006/076904 A1 | 7/2006 |
| WO | WO-2007/021263 A1 | 2/2007 |
| WO | WO-2009/038502 | 3/2009 |

OTHER PUBLICATIONS

International Search Report issued by Korean Intellectual Property Office dated Jun. 16, 2009 for International Application No. PCT/US2008/083404.
U.S. Appl. No. 12/292,150, filed Nov. 12, 2008, Leonard Cech et al.
Written Opinion and International Search Report mailed Apr. 14, 2009, received in corresponding International Application No. PCT/US2008/083393 (6 pgs.).
International Search Report dated Sep. 29, 2009 for International Application No. PCT/US2009/048015.
Communication (Supplementary EP Search Report) in EP Appln No. 08849392.9 dated Nov. 3, 2011.
Communication (Supplementary EP Search Report) in EP Appln No. 08849994.2 dated Oct. 27, 2011.
Office Action in U.S. Appl. No. 12/292,150 dated Aug. 8, 2011.
US Office Action; U.S. Appl. No. 12/213,591, Apr. 1, 2011; 11 pages.
First Office Action of China State Intellectual Property Office Application No. 200980123048.9 dated Oct. 9, 2012.
Office Action Japanese Patent Application No. 2010-534175 dated Feb. 12, 2013.
Notification of Reasons for Refusal dated Sep. 18, 2013 issued in connection with Japanese Application No. 2011-514858.
Office Action dated Jan. 14, 2014 issued in connection with Japanese Patent Application No. 2010-534178, with English translation.
Office Action dated May 21, 2013 issued in connection with Japanese Application No. 2010-534178, with English translation.
Decision of Rejection dated Jul. 22, 2014 issued in connection with Japanese Application No. 2010-534178 with English translation.

* cited by examiner

SYSTEM AND METHOD FOR RECEIVING AUDIBLE INPUT IN A VEHICLE

CROSS-REFERENCE TO RELATED PATENT APPLICATIONS

This application is a continuation-in-part of U.S. patent application Ser. No. 12/213,591 filed on Jun. 20, 2008 and also claims priority to and the benefit of U.S. Provisional Application Nos. 60/996,351 (filed Nov. 13, 2007) and 61/006,298 (filed Jan. 4, 2008), each of the foregoing applications is incorporated herein by reference in its entirety.

BACKGROUND

The present disclosure relates generally to the field of a system and method for receiving an audible input in a vehicle. More specifically, the disclosure relates to a steering wheel having at least one microphone and configured to process audible input.

A communication steering wheel device has been developed in which a variety of informational messages can be displayed to the driver primarily through icons. These messages include a variety of warning messages, informational messages about upcoming landmarks, navigation commands, etc. For example, see US Published Application US20060070795 and WIPO Publications WO2006076903 and WO2006076904 (all three applications incorporated by reference herein).

A vehicle may include microphones to provide or control additional features (e.g., hands free telephone use, navigation control, etc.) using voice recognition algorithms. Much attention has been placed in the industry to improve and refine voice recognition but significant challenges remain to make such systems sufficiently reliable for automotive use. For example, detection of the driver voice can be obscured by other voices and sources of noise in and outside of the car. Currently, an input device (microphone) may be included within the instrument panel (IP) or headliner of the vehicle. There is a need for a system and method for filtering out road noise, car noise, other occupants, and other noise for voice recognition.

SUMMARY

One embodiment of the disclosure relates to a steering wheel system for a vehicle. The steering wheel system includes a first microphone mounted in a steering wheel and a second microphone mounted in the steering wheel or other location in the vehicle in the relative vicinity of the first microphone. The first and second microphones are each configured to receive an audible input. The audible input includes an oral command component and a noise component. The steering wheel system also includes a controller configured to identify the noise component by determining that the noise component received at the first microphone is out of phase with the noise component received at the second microphone. The controller is configured to cancel the noise component from the audible input.

Another embodiment of the disclosure relates to a method for canceling noise received by a vehicle system configured to receive oral commands. The vehicle system includes a first microphone, a second microphone, and a controller. The method includes the steps of receiving an audible input at the first microphone and receiving the audible input at the second microphone. The audible input includes an oral command component and a noise component. The method also includes the steps of identifying the noise component using the controller by determining that the noise component received at the first microphone is out of phase with the noise component received at the second microphone. The method also includes the step of canceling the noise component from the audible input using the controller.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
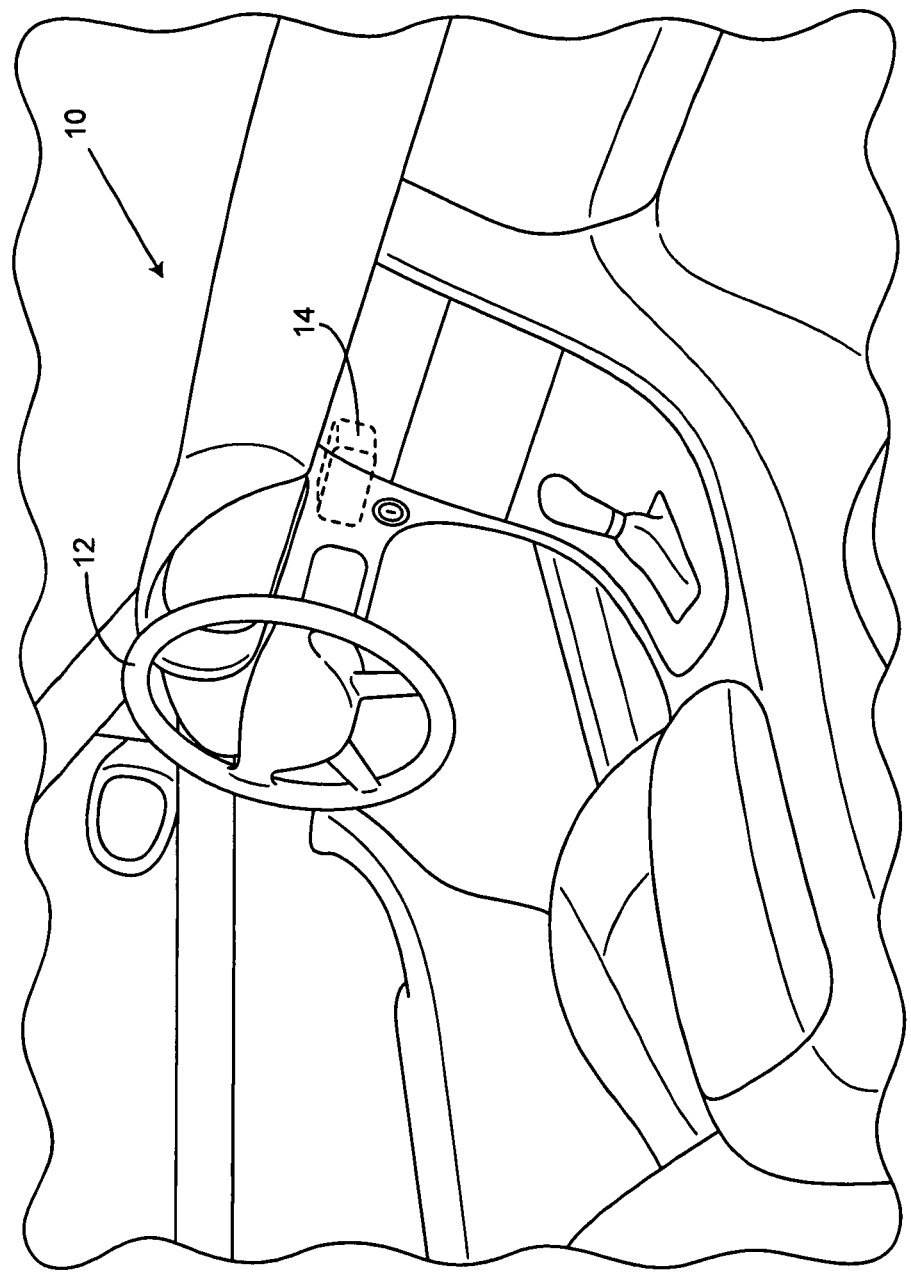
FIG. 1 is a perspective view of a vehicle cockpit, according to an exemplary embodiment.

Referring to FIG. 1, a vehicle driver may operate a vehicle from a cockpit 10. The cockpit 10 includes a steering wheel 12 and a controller 14. The driver may rotate the steering wheel to turn the vehicle wheels and steer the vehicle in a desired direction. The steering wheel 12 may also be configured to receive an audible input, for example at one or more microphones, including an oral command. The oral command can be parsed and interpreted or recognized by controller 14 using voice recognition software. Controller 14 can then send an electronic signal representative of the oral command to a vehicle system (e.g., an audio system, a navigation system, a vehicle bus interface, instrument panel electronics, etc.) or to an electronic device coupled to the vehicle via a wired or wireless connection (e.g., a cellular phone, a personal navigation device (PND), a personal digital assistant (PDA), a portable media player, etc.). The electronic signal may cause the vehicle system or electronic device to perform a specific task or operation. For example, a user may provide oral commands to dial a telephone number on a coupled cellular phone, to provide destination information to a navigation system or personal navigation device, to adjust a volume or the media of a portable media player or an audio system, etc.

The steering wheel 12 may also be configured to provide a message (e.g., a visual message, an audible message, etc.) to the driver related to a vehicle state or to a coupled electronic device. The message may be generated by a controller 14 based on data related to an oral command and/or data received from a vehicle system or electronic device. The message can be a message related to navigation (e.g., how to negotiate or maneuver a corner, where to turn, etc.), related to a hands-free telephone call, related to an audio system, etc. According to various exemplary embodiments, the steering wheel 12 may be any steering wheel usable by a driver to steer the vehicle and capable of receiving a command from and/or providing a message to the driver. According to various exemplary embodiments, the controller 14 may be an analog controller, a digital controller, a software controller, or any combination thereof. According to some exemplary embodiments, controller 14 may be integrated into steering wheel 12.

Figure 2:
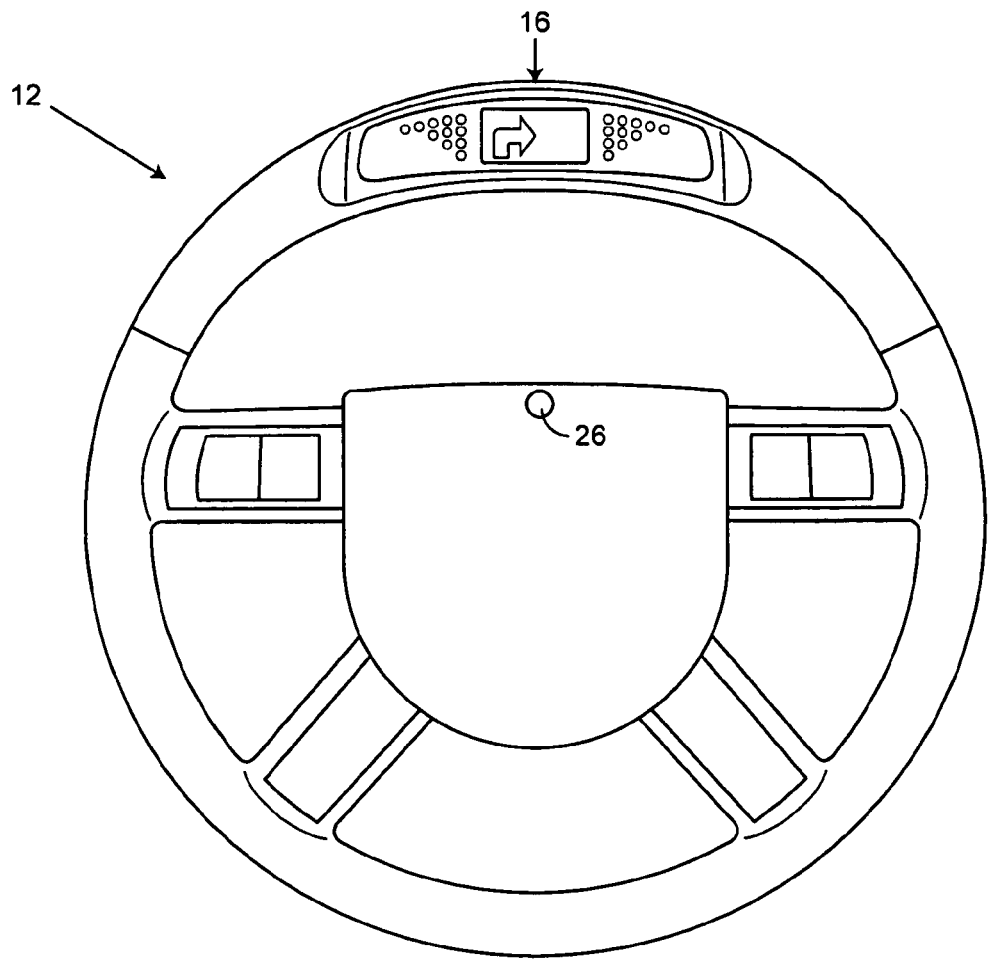
FIG. 2 is a schematic view of a steering wheel including a display, according to an exemplary embodiment.
Figure 3:
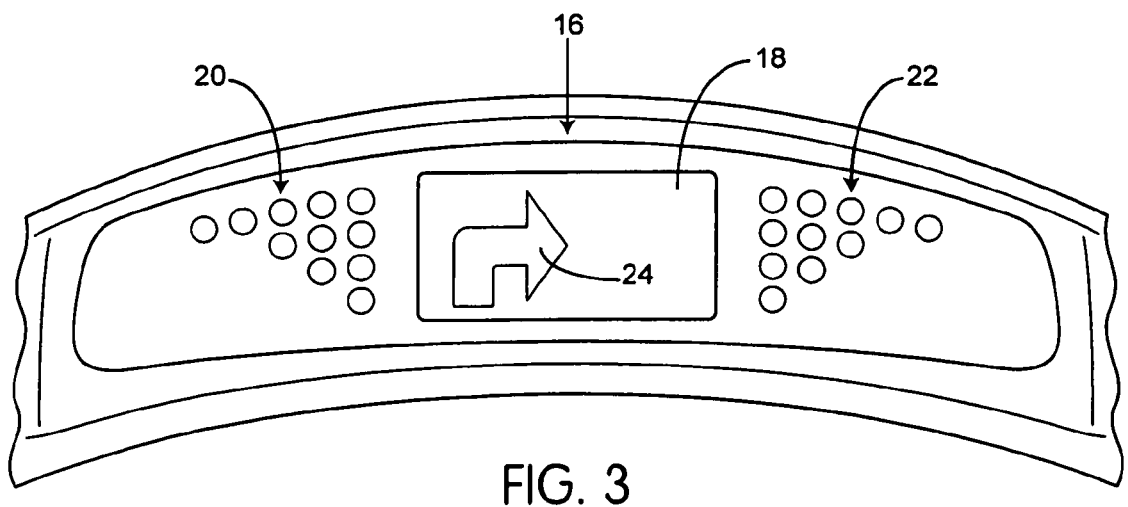
FIG. 3 is a more detailed schematic view of the display of FIG. 2, according to an exemplary embodiment.

Referring to FIGS. 2-3, the steering wheel 12 may include a display 16, for providing messages to the driver, according to some exemplary embodiments. The display generally includes display portions 18, 20, and 22.

The display portion 18 is configured to display or illuminate an icon 24 to indicate a direction that a driver should maneuver or steer the vehicle. The icon 24 may have a fixed shape and size or a variable shape and size that indicates the angle of a turn. A variably shaped icon may change shapes as the vehicle approaches or proceeds through the maneuver. The icon 24 may be of a single color, a user-configurable color, or multiple colors that vary based on the degree of the or severity of the maneuver. For example, a green icon may indicate that the maneuver may be achieved at a current speed, a yellow icon may indicate that the maneuver may be unsafe at the current vehicle speed, and a red icon may indicate that the maneuver is unsafe at the current speed. The icon 24 may be of a fixed intensity, a user-configurable intensity, or an intensity that varies with the degree or severity of the maneuver. For example, a less intense icon may indicate that the maneuver may be achieved at a current speed while a more intense icon may indicate that the speed should be reduced.

While the display portion 18 is shown to include a single icon, according to other exemplary embodiments, multiple icons may be displayed. According to other exemplary embodiments, the display portion 18 may be configured to provide graphical and/or text messages to the driver related to the state of a vehicle system or an attached electronic device (e.g., media playback information, more detailed navigation information, telephone call information, etc.). The display portion 18 may include multiple LEDs (organic or inorganic), an LCD display, a TFT display, an incandescent bulb, a plasma display, and/or a CRT display.

According to some exemplary embodiments, the information exchanged between the steering wheel 12 and the vehicle systems or electronic devices can be sent via a connection between through a wired or wireless vehicle network (e.g., CANbus or other any other vehicle bus). Bluetooth wireless technology is now routinely supported in automotive applications for "hands-free" telephony and other electronic device connections and there are several other wireless protocols that can be used, including a WiFi standard or another limited-range, low power standard.

Once a cell phone or PDA has been enabled, the driver can interact with a cell phone or PDA to receive calls/make calls using the steering wheel 12, without direct tactile interaction with the phone. The cell phone can be built into the car, or an aftermarket device such as a pocket cell phone, PDA, or PND that has a Bluetooth transceiver. The device can make a wireless connection via a cell phone network and can handle all in-coming and outgoing calls. Likewise, a connection to a navigation device can facilitate hands-free driver use without any tactile interaction. The driver can initiate calls or accept the calls through voice recognition of oral commands received at a microphone 26. The microphone 26 may be located anywhere on the steering wheel 12.

According to some exemplary embodiments, a navigation system can be housed inside the steering wheel 12. The navigation system can provide turn-by-turn directions to the driver of the vehicle. The destination information can be entered into the navigation system through oral commands received at microphone 26 without the need to place keyboards, trackballs, or cumbersome additional switches on the steering wheel 12. The data is entered on a cell phone or PDA and then transmitted to the steering wheel 12 through the Bluetooth or other wireless link. Alternatively, the navigation device need not be fully integrated into the steering wheel 12. It could also be a stand-alone aftermarket navigation device that receives destination information from the cell phone/PDA. Thus the cell phone/PDA would be linked to a separate PND through the steering wheel 12 using the bidirectional wireless system. The link to a cell phone can provide caller ID information on display 16 or can enable the driver to accept or reject phone calls through the cell phone/PDA/Blackberry via oral commands.

Information may also be provided to the navigation system from other vehicle sensors. For example, host vehicle yaw rate and velocity data determined from vehicle sensors may be provided to the navigation system (either internal navigation system or an aftermarket navigation system) for use by the navigation system. For example, the navigation system can conduct a dead reckoning type analysis of vehicle position using the vehicle sensor data in the event that GPS data is no longer available. Both the vehicle sensors and the navigation system may be connected to a CANbus so that information can pass both to and from the navigation system via the data bus. Alternatively, the vehicle sensor data could be passed to the CSW via the car network (e.g., a data bus) and transmitted/exchanged with the navigation system using a wireless protocol (e.g., Bluetooth).

One exemplary embodiment of the steering wheel 12 dims the display 16 when the steering wheel is turned away from the normal or 12 o'clock upright position. The brightness of the display 16 may be adjusted or changed to provide a cue to the driver regarding an upcoming turn or other issues that need to be brought to the driver's attention. The display 16 can be dimmed when turning the wheel to reduce driver distractions, and raise the display intensity when the steering wheel is returned to the straight or normal position. Detection of the turning steering wheel can be made through use of steering angle sensors, steering angle rate sensors, tilt sensors or other inertial sensors.

Detecting the driver voice from all other voices and sources of noise in and outside of the vehicle can be challenging. The placement of the microphone 26 in a position the driver is facing during general driving (i.e., driver eyes on road) may result in voice commands from the driver having the highest possible amplitude (of voice intensity) based on a line of sight between the driver mouth and the microphones.

Figure 4:
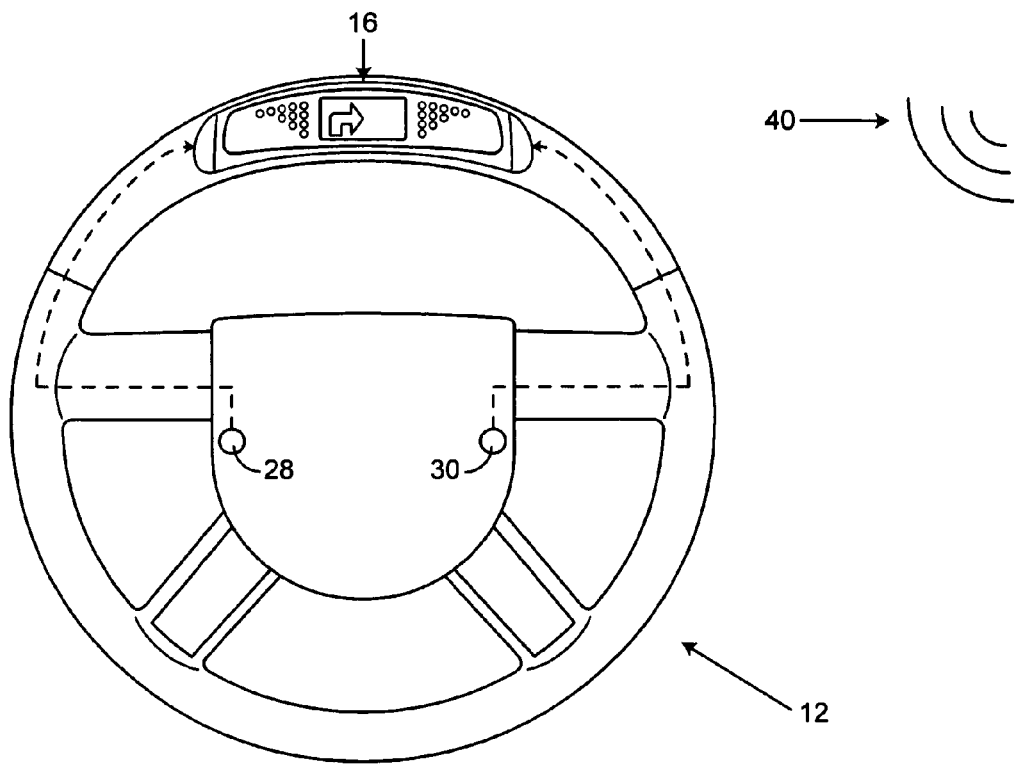
FIG. 4 is a schematic view of the steering wheel of FIG. 2 receiving audible inputs from various sources according to an exemplary embodiment.
Figure 4:
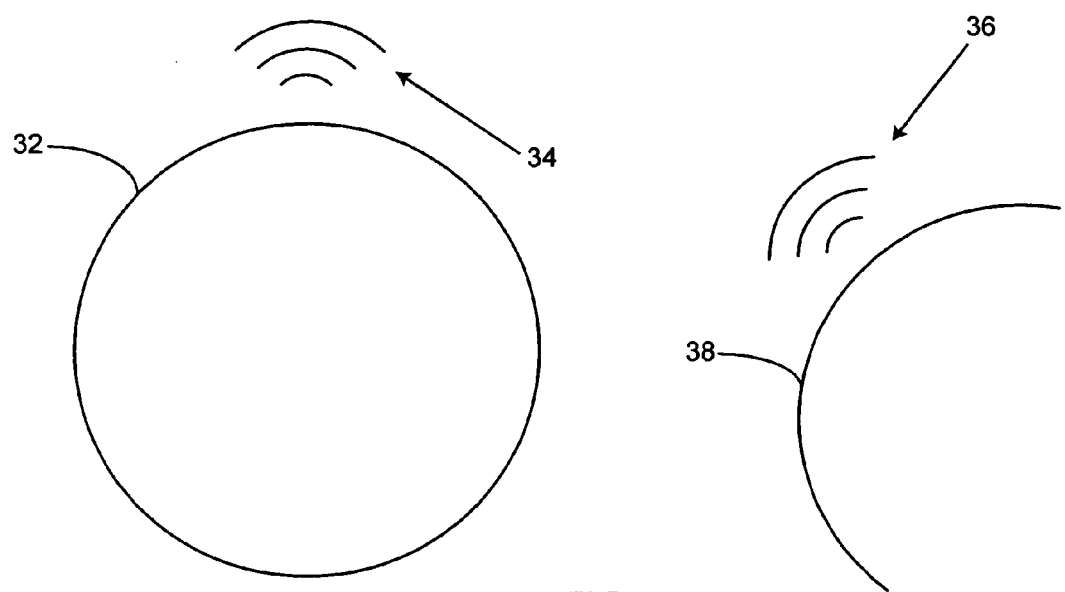

Referring to FIG. 4, the steering wheel may include multiple microphones 28 and 30 to provide stereo sound inputs and enable the steering wheel 12 to provide or control additional features. The use of two microphones 28, 30 positioned generally equidistant from the steering wheel 12 center line may further improve detected voice amplitude. If a driver 32 is facing forward and the steering angle is within typical driving ranges (near 0 degrees), oral commands 34 reached at each microphone 28, 30 are very close in phase. However for other sounds received at each of the microphones 28, 30, such as noise 36 from a passenger 38 and other noise 40 (e.g., from the road, engine, fan, wind, etc.), the phases are different because the sources of the noise are not equidistantly directed towards the microphones 28, 30. Stereo noise cancellation techniques can be used to clarify the voice or oral commands 34 of the driver 32 from the stereo microphones 28, 30 to improve the audible input into voice recognition software of controller 14. Because the noise 36, 40 is detected to be out of phase and the oral commands 34 are detected to be in phase, the controller 14 can cancel or eliminate at least a portion of the noise 36, 40 from the oral commands 34.

Figure 5:
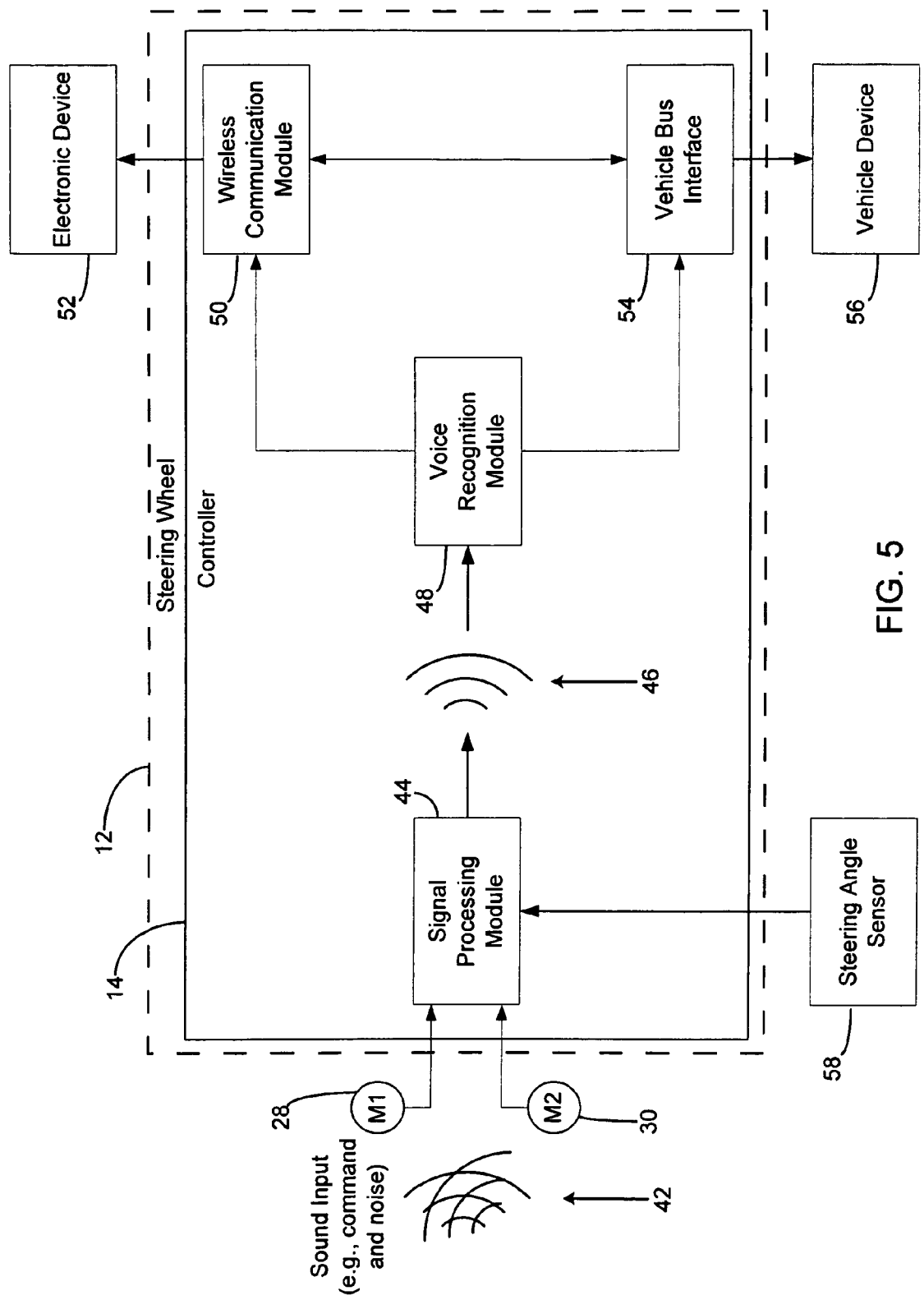
FIG. 5 is a block diagram of a steering wheel system according to an exemplary embodiment.

Referring to FIG. 5, a block diagram further illustrates the use of the stereo microphones 28, 30 in the steering wheel 12 to receive an audible input 42 that contains the oral command 34 component and the noise 36, 40 component(s). Controller 14 receives electrical signals at a signal processing module 44 from each microphone 28, 30 that are representative of the audible input 42. The signal processing module 44 compares the phases of the input components to identify the oral command 34 and/or the noise 36, 40 component(s). Once the oral command 34 and noise 36, 40 are identified, the signal processing module 44 can at least partially cancel out the noise 36, 40 component(s) and generate an electrical signal 46 that is representative of the oral command 34. A voice recognition module 48 receives the signal 46 and determines tasks or operations to perform based on the signal 46.

According to one exemplary embodiment, the voice recognition module 48 may use a wireless communication module 50 to interface and communicate with an electronic device 52 (e.g., a cell phone, a PDA, a PND, a portable media device, etc.) over a wireless communication link (e.g., Bluetooth, WiFi, etc.). The voice recognition module may instruct the electronic device 52 to perform an operation, for example an operation related to a telephone call (e.g., dial, hang-up, send/receive text message, etc.), media playback (e.g., select media, adjust playback, etc.), data management (e.g., dictate a memo or note, update/review calendar, establish Internet connection, etc.), or navigation (e.g., input destination, request points of interest, etc.).

According to another exemplary embodiment, the voice recognition module 48 may use a vehicle bus interface 54 to interface and communicate with a vehicle system or device 56 (e.g., a navigation system, an audio system, instrument panel electronics, etc.) over a vehicle bus (e.g., CANbus). The voice recognition module may instruct the vehicle system or device 56 to perform an operation, for example an operation related to media playback (e.g., select media, adjust playback, adjust volume, etc.) or navigation (e.g., input destination, request points of interest, etc.).

When the steering wheel 12 is turned at a high angle, the two microphones 28, 30 may no longer be equidistant from the driver 32 and the voice recognition module 48 may have difficulty detecting oral commands 34 because the input to each microphone 28, 30 are no longer in phase. Vehicles generally include an Electronic Stability Control (ESC) system and many ESC systems use a steering angle sensor 58 to aid in calculating vehicle stability. The steering angle information from the steering angle sensor 58 can be used to compensate for range distances between the driver and each microphone 28, 30 that cause the oral command 34 to be out of phase. Based on the steering angle, the signal processing module 44 can determine an expected phase difference of the oral command 34 and match the expected phase difference with the components of the audible input 42 to identify the oral command 34 component and cancel the noise 36, 40 component(s). While the steering angle sensor 58 as described is a part of an ESC system, according to other exemplary embodiments, the steering angle sensor 58 may be a stand alone steering angle sensor.

It is noted that according to various exemplary embodiments, the signal processing module, the voice recognition module 48, the wireless communication module 50, and the vehicle bus interface 54 can each include analog circuitry, digital circuitry, and/or software. While the microphones 28, 30 and controller 14 are shown embodied in the steering wheel 12, according to other exemplary embodiments, the controller 14 may be outside of the steering wheel 12 or the microphones 28, 30 may be located outside of the steering wheel 12. If the microphones 28, 30 are not located on the steering wheel 12, controller 14 can determine an expected phase difference for oral commands based on the location.

Figure 6:
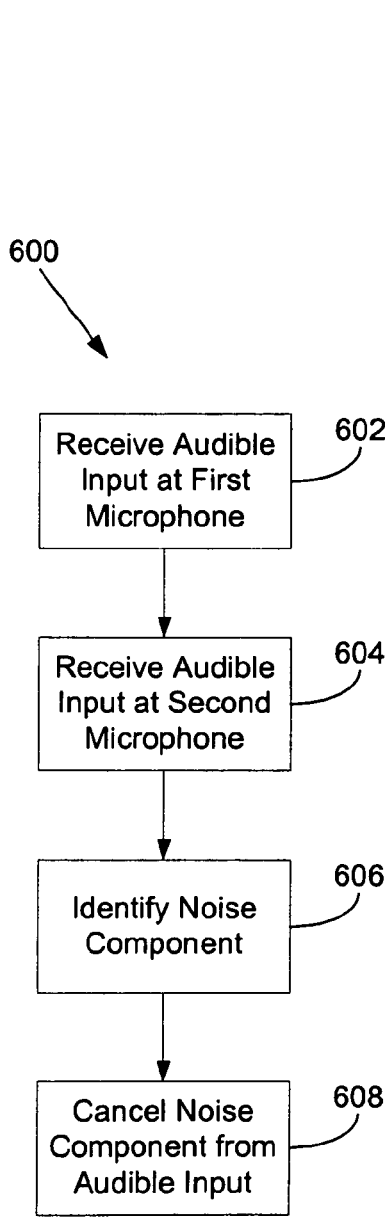
FIG. 6 is a flow chart of a method for cancelling noise in the steering wheel system of FIG. 5 according to an exemplary embodiment.

Referring to FIG. 6, a method 600 is shown for canceling noise 36, 40 from the audible input 42 received by the steering wheel 12. At step 602, one of the microphones 28, 30 receives the audible input 42 and at step 604, the other of microphone 28,30 receives the audible input 42. It is noted that while the microphones 28, 30 are illustrated as receiving the audible input 42 at different time periods, the audible input 42 may be received at generally the same time for each microphone 28, 30. The controller receives an electronic signal representative of the audible input 42. At step 606, the controller 14 then identifies the noise 36, 40 component by determining that the phase of the noise component received at the first microphone is different than the phase of the noise component received at the second microphone. At step 608, the controller at least partially cancels the identified noise 36, 40 component from the audible input 42, leaving the oral command 34 component. It is noted that according to other exemplary embodiments, the oral command 34 component may be identified by a very low difference (instead of identifying the noise 36, 40 component) and the controller 14 may cancel out all other components.

Figure 7:
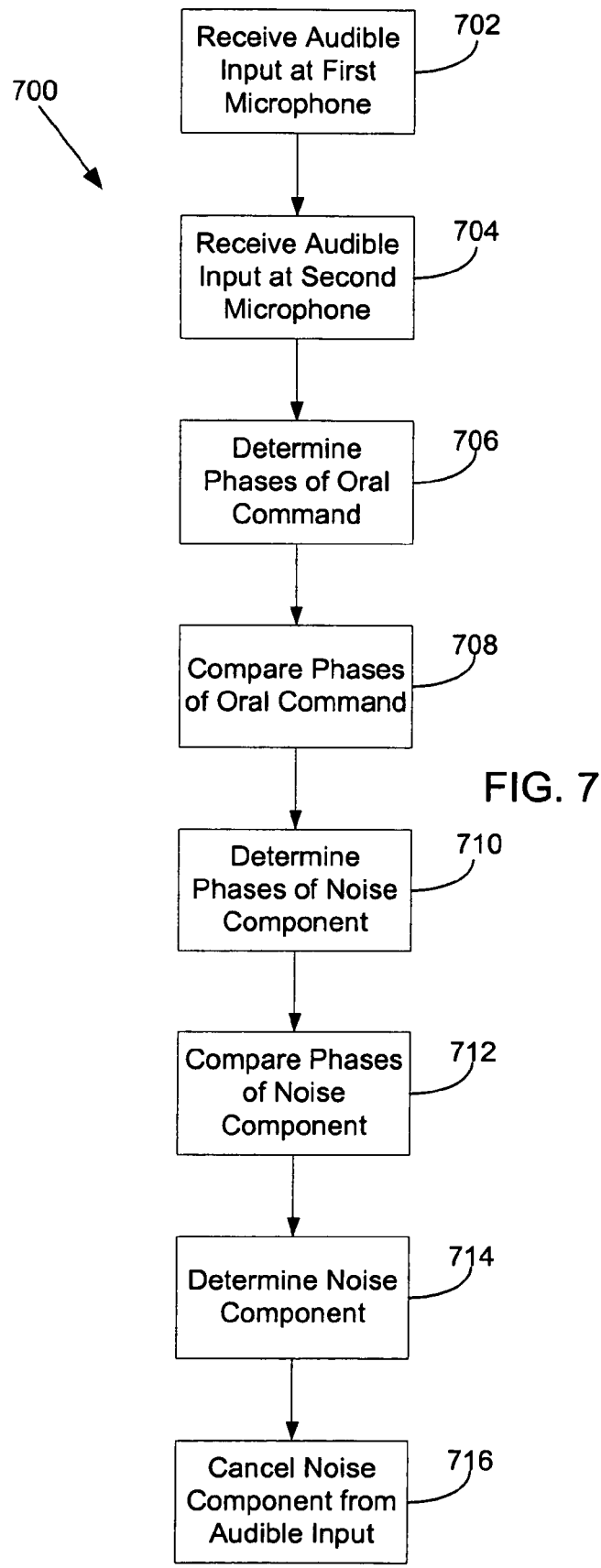
FIG. 7 is a more detailed flow chart of a method for cancelling noise in the steering wheel system of FIG. 5 according to another exemplary embodiment.

Referring to FIG. 7, a method 700 is shown for canceling noise 36, 40 from the audible input 42 received by the steering wheel 12. At step 702, one of the microphones 28,30 receives the audible input 42 and at step 704, the other of microphone 28,30 receives the audible input 42. It is noted that while the microphones 28, 30 are illustrated as receiving the audible input 42 at different time periods, the audible input 42 may be received at generally the same time for each microphone 28, 30. The controller receives an electronic signal representative of the audible input 42. At step 706, the controller 14 determines the phases of the received oral command 34. At step 708, the controller 14 compares the two phases to find little difference and identify that the received component is the oral command 34. At step 710, the controller 14 determines the phases of the received noise 36,40. At step 712, the controller 14 compares the two phases to find a difference and identify that the received component is noise 36,40. At step 714, the controller 14 then identifies the noise 36, 40 component based on the comparisons of steps 708 and 712. At step 716, the controller at least partially cancels the identified noise 36, 40 component from the audible input 42, leaving the oral command 34 component.

It is noted that according to other exemplary embodiments, the oral command 34 component may be identified by a very low difference (instead of identifying the noise 36, 40 component) and the controller 14 may cancel out all other components. According to other exemplary embodiments, the method 700 may only determine and compare phases of the oral command 34 or of the noise 36, 40. It is noted that while the controller 14 is illustrated as determining and comparing phase information for the oral command 34 before the noise 36, 40, controller 14 may determine and/or compare phase information for the oral command 34 and the noise 36, 40 in any order or simultaneously.

Figure 8:
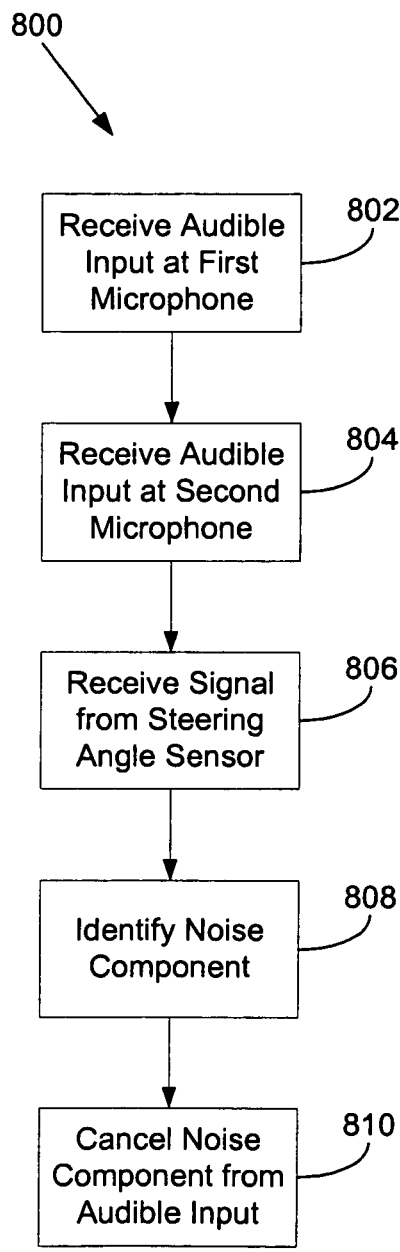
FIG. 8 is a flow chart of a method for cancelling noise in the steering wheel system of FIG. 5 according to a further exemplary embodiment.

Referring to FIG. 8, a method 800 is shown for canceling noise 36, 40 from the audible input 42 received by the steering wheel 12. At step 802, one of the microphones 28, 30 receives the audible input 42 and at step 804, the other of microphone 28,30 receives the audible input 42. It is noted that while the microphones 28, 30 are illustrated as receiving the audible input 42 at different time periods, the audible input 42 may be received at generally the same time for each microphone 28, 30. The controller receives an electronic signal representative of the audible input 42. At step 806, the controller receives a steering angle signal from the steering angle sensor 58. The steering angle signal from the steering angle sensor 58 can be used to compensate for range distances between the driver and each microphone 28, 30 that cause the oral command 34 to be out of phase. Based on the steering angle, the signal processing module 44 can determine an expected phase difference of the oral command 34 and match the expected phase difference with the components of the audible input 42 to identify the oral command 34 component and cancel the noise 36, 40 component(s). At step 808, the controller 14 then identifies the noise 36, 40 component by determining that the phase of the noise component received at the first microphone is different than the phase of the noise component received at the second microphone. At step 810, the controller at least partially cancels the identified noise 36, 40 component from the audible input 42, leaving the oral command 34 component. It is noted that according to other exemplary embodiments, the oral command 34 component may be identified by a very low difference (instead of identifying the noise 36, 40 component) and the controller 14 may cancel out all other components. It is also noted that steering angle sensor 58 may also be utilized in the method 700 of FIG. 7.

As an alternative embodiment to those exemplary embodiments described above, the system could include a single microphone located in the vicinity of the hub or center line of the steering wheel. Alternatively, one or more microphones could be located on the rim of the steering wheel. The microphone(s) may be located at any suitable location on the steering wheel according to manufacturing and operational concerns.

According to another exemplary embodiment, the first and second microphones shown, for example, in FIG. 1 and mentioned, for example, in FIGS. 6 and 7 could be located on different components of the vehicle. For example, according to one exemplary embodiment one or more microphones could be located on the steering wheel and one or more microphones could be located on the instrument panel or other convenient mounting location in the vicinity of the vehicle occupant. Thus, the system and method for canceling the noise component could be based on microphone(s) located on different vehicle components.

The present disclosure has been described with reference to exemplary embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter. It is also noted that the disclosed methods may be performed in any of a variety or sequence of steps and may include more or fewer steps than illustrated.

What is claimed is:

1. A steering wheel system for a vehicle, comprising:
a first microphone mounted in a steering wheel and configured to send a first electronic signal representative of an audible input comprising an oral command component and a noise component;
a second microphone mounted in the vehicle and configured to send a second electronic signal representative of the audible input comprising the oral command component and the noise component;
a steering wheel angle sensor; and
a controller configured to:
receive the first and second electronic signals,
identify the noise component by determining that the noise component in the received first electronic signal is out of phase with the noise component in the received second electronic signal, and
cancel the identified noise component from the audible input based on an input from the steering wheel angle sensor so as to obtain the oral command component from the received first and second electronic signals.

2. The system of claim 1, wherein the second microphone is mounted on the steering wheel and the first and second microphones are equidistant from a center of the steering wheel.

3. The system of claim 1, wherein the noise component is from at least one of a vehicle passenger, road noise, engine noise, fan noise, wind noise, and noise outside of the vehicle.

4. The system of claim 1, wherein the oral command component is an oral command uttered by a driver of the vehicle for controlling an electronic device.

5. The system of claim 4, wherein the electronic device is at least one of a cellular phone, a personal navigation device, a portable media player, and a personal digital assistant.

6. The system of claim 4, wherein the electronic device is a vehicle control system.

7. The system of claim 6, wherein the vehicle control system is at least one of an integrated audio system, an integrated navigation system, a vehicle bus interface, and instrument panel electronics.

8. The system of claim 4, wherein the controller communicates with the electronic device via a wireless connection.

9. A method for canceling noise received from an audible input received by a vehicle system configured to receive an oral command, the vehicle system including a first microphone, a second microphone, and a controller, the method comprising the steps of:
- receiving the audible input at the first microphone;
- generating a first electronic signal representative of the audible input received at the first microphone so as to be received by the controller, the audible input at the first microphone comprising an oral command component and a noise component;
- receiving the audible input at the second microphone;
- generating a second electronic signal representative of the audible input received at the second microphone so as to be received by the controller, the audible input at the second microphone comprising the oral command component and the noise component;
- receiving a steering angle signal from a steering wheel angle sensor at the controller;
- identifying the noise component using the controller by considering the steering angle signal and determining that a phase of the noise component in the received first electronic signal is different than a phase of the noise component in the received second electronic signal; and
- canceling the identified noise component from the audible input using the controller so as to obtain the oral command component from the received first and second electronic signals.

10. The method of claim 9, wherein the vehicle system is a steering wheel.

11. The method of claim 10, wherein the first and second microphones are equidistant from a center of the steering wheel.

12. The method of claim 9, wherein the noise component is from at least one of a vehicle passenger, road noise, engine noise, fan noise, wind noise, and noise outside of the vehicle.

13. The method of claim 9, further comprising the steps of:
- generating an electronic control signal based on the oral command using the controller; and
- sending the electronic control signal from the controller to an electronic device over a communication link for controlling a function of the electronic device.

14. The method of claim 13, wherein the electronic device is at least one of a cellular phone, a personal navigation device, a portable media player, and a personal digital assistant.

15. The method of claim 13, wherein the electronic device is a vehicle control system.

16. The method of claim 15, wherein the vehicle control system is at least one of an integrated audio system, an integrated navigation system, a vehicle bus interface, and instrument panel electronics.

17. The method of claim 13, wherein the communication link is a wireless communication link.

* * * * *